United States Patent
Bohlig et al.

(10) Patent No.: US 7,264,124 B2
(45) Date of Patent: Sep. 4, 2007

(54) SYSTEMS AND METHODS FOR SORTING RECYCLABLES AT A MATERIAL RECOVERY FACILITY

(75) Inventors: James W. Bohlig, Rutland, VT (US); Sean P. Duffy, Huntersville, NC (US)

(73) Assignee: Casella Waste Systems, Inc., Rutland, VT (US)

( * ) Notice: Subject to any disclaimer, the term of this patent is extended or adjusted under 35 U.S.C. 154(b) by 107 days.

(21) Appl. No.: 10/989,604

(22) Filed: Nov. 17, 2004

(65) Prior Publication Data

US 2005/0126958 A1    Jun. 16, 2005

Related U.S. Application Data

(60) Provisional application No. 60/587,031, filed on Jul. 13, 2004, provisional application No. 60/531,663, filed on Dec. 23, 2003, provisional application No. 60/520,310, filed on Nov. 17, 2003.

(51) Int. Cl.
*B02C 15/00* (2006.01)
*B07B 9/00* (2006.01)

(52) U.S. Cl. ............ 209/30; 241/24.22; 241/24.3

(58) Field of Classification Search ............ 209/21, 209/30–37, 44.4; 241/24.12, 24.13, 24.14, 241/24.19, 24.21, 24.22, 24.3
See application file for complete search history.

(56) References Cited

U.S. PATENT DOCUMENTS

| | | | |
|---|---|---|---|
| 3,802,558 A * | 4/1974 | Rhys | 209/557 |
| 5,299,693 A | 4/1994 | Ubaldi et al. | |
| 5,314,071 A * | 5/1994 | Christian et al. | 209/4 |
| 5,333,797 A * | 8/1994 | Becker et al. | 241/19 |
| 5,485,925 A | 1/1996 | Miller et al. | |
| 5,588,598 A | 12/1996 | Becker et al. | |
| 5,718,737 A | 2/1998 | Mosch | |
| 6,144,004 A | 11/2000 | Doak | |
| 6,168,102 B1 * | 1/2001 | Bergart | 241/99 |
| 6,230,521 B1 | 5/2001 | Lehman | |
| 6,401,936 B1 | 6/2002 | Isaacs et al. | |
| 6,484,886 B1 | 11/2002 | Isaacs et al. | |
| 6,763,280 B1 | 7/2004 | Lehman | |

(Continued)

FOREIGN PATENT DOCUMENTS

DE     10135678     2/2003

(Continued)

OTHER PUBLICATIONS

Aug. 1, 1992. "Einsatz Von Mogensen Vibro-Stangensizer Beim Altglas-Recycling." Aufbereitungs Technik, Verlag Fuer Aufbereitungs. Weisbaden, DE. XP000256701. ISSN: 0004-783X. p. 460-462 and Figure 2.

(Continued)

*Primary Examiner*—Joseph Rodriguez
(74) *Attorney, Agent, or Firm*—Wilmer Cutler Pickering Hale and Dorr LLP

(57) ABSTRACT

Systems and methods for providing a quantity of cullet having at least two colors of glass from an input stream of recyclable material and non-recyclable material. In an embodiment, the system includes a sortation station, a screening apparatus, an air classifier, and a crushing apparatus to provide as output substantially pure cullet having at least two colors.

39 Claims, 12 Drawing Sheets

U.S. PATENT DOCUMENTS

2005/0126958 A1    6/2005    Bohlig et al.

FOREIGN PATENT DOCUMENTS

| EP | 0439674 | 4/2004 |
|---|---|---|
| GB | 1450940 | 9/1976 |
| GB | 1528236 | 10/1978 |

OTHER PUBLICATIONS

Tim Goodman & Associates. Aug. 11, 2003. *Materials Recovery Facilities operational Assessmenr Final Report and Optimization Guide.*

European Search Report for European Patent Application No. 05254327.9 mailed Oct. 25, 2005.

European Partial Search Report for European Patent Application No. 05254328.7 mailed Nov. 21, 2005.

Form PCT/ISA/220: Notification of Transmittal of the International Search Report and the Written Opinion.

Form PCT/ISA/210: International Search Report from corresponding PCT Application No. PCT/US2005/039464 dated Dec. 4, 2006.

Form PCT/ISA/237: Written Opinion of corresponding PCT Application No. PCT/US2005/039464 dated Dec. 4, 2006.

US 5,041,996, 08/1991, Emering (withdrawn)

* cited by examiner

SYSTEMS AND METHODS FOR SORTING RECYCLABLES AT A MATERIAL RECOVERY FACILITY

REFERENCE TO RELATED APPLICATIONS

This application claims the benefit under 35 U.S.C. § 119(e) of U.S. Provisional Application No. 60/520,310, filed Nov. 17, 2003, which is incorporated herein by reference. This application also claims the benefit under 35 U.S.C. § 119(e) of U.S. Provisional Application No. 60/531,663, filed Dec. 23, 2003, which is incorporated herein by reference. This application also claims the benefit under 35 U.S.C. § 119(e) of U.S. Provisional Application No. 60/587,031, filed Jul. 13, 2004, which is incorporated herein by reference.

FIELD OF THE INVENTION

The present invention relates to systems and methods for sorting recyclables at a material recovery facility (MRF).

BACKGROUND OF THE INVENTION

Cost-effective recycling of materials, such as glass, plastics, and metals, has become an increasingly important issue to many businesses because of ever-increasing legislative mandates at the federal, state, and local levels and the associated cost of complying therewith. In a recycling process, an entity such as a material recovery facility (MRF) can face several significant challenges concerning increasing and/or optimizing the amount of recyclable materials recovered during processing, and decreasing operational costs such as labor costs.

A MRF generally serves as a drop-off and gross-sorting (and limited processing) point for recycled materials, so that sorted recycled materials can be transported, for example, to a customer of the recycled material for subsequent processing. Recyclable materials generally enter a MRF either in a single stream or dual stream. A single stream consists of a mixture of glass, plastics, and/or metals (collectively referred to herein as "commingled containers"), old news print (ONP) (e.g., newspaper and newspaper inserts), old corrugated paper (OCC), old telephone directories (OTD), old magazines (OMG), junk mail and/or office paper (collectively referred to herein as "fiber material"). A dual stream MRF consists of a commingled container stream and a fiber material stream. While traditional MRFs typically utilize a dual stream configuration, the desire to reduce labor and other operational costs has been an impetus behind the trend toward single stream MRFs.

A gross sort involves separating material by type. For example, glass, plastic, aluminum, fiber, etc. can each be physically separated from each other. In the case of glass, a conventional MRF typically sorts glass by size and color, each of which incurs a labor cost, can cause substantial wear and tear on machinery and equipment, and generally results in higher maintenance costs and lower profit margins.

Regarding size, much of the glass that enters a MRF is not in the form of whole containers. Instead, containers are typically broken, often into numerous pieces of widely varying sizes, which can complicate and increase the cost associated with sorting glass at a conventional MRF. Pieces of mixed color (e.g., flint, amber, green) glass smaller than approximately 2.5 inches are referred to as mixed cullet or residue (hereinafter mixed cullet). Currently, the economics of glass recycling is such that it is profitable (or more profitable) for pieces of glass approximately 2.5 inches or larger to be cleaned and processed for recycling, as it is generally too difficult and expensive to sort, clean and otherwise process mixed cullet.

Mixed cullet is thus typically either used in aggregate form as a landfill cover material, or is further processed, at an additional cost, so that it can be used, for example, as a paving material such as glasphalt (a highway paving material in which recovered ground glass replaces some of the gravel in asphalt) and/or aggregate (material such as glass, sand or small stones mixed with a binder such as cement to produce mortars and concrete).

U.S. Pat. No. 5,588,598, entitled "Commingled Recyclables Recovery and Recycling Process and Related Apparatuses," which is incorporated herein by reference, describes how glass unsuitable for recovery is introduced into a trommel processing loop which substantially removes contaminants, and reduces the glass to a particulate. However, processing the mixed cullet as landfill or as a paving material is generally less profitable than processing a same volume of glass that does not include mixed cullet for subsequent sale to a beneficiator and/or a glass plant.

In addition, sorting glass by color (e.g., into flint, amber, and green components) also poses challenges to a MRF. Color sorting for both mixed cullet and pieces of glass greater than approximately 2.5 inches in size is desirable for use in conventional glassmaking techniques. U.S. Pat. No. 5,485,925, entitled "System and Method for Separating Recycled Debris," which is incorporated herein by reference, discusses several initial screening methods, including manual sorting. European patent EP0439674, entitled, "Device for Sorting Waste," which is incorporated herein by reference, describes the use of robotic sorters. However, U.S. Pat. No. 5,485,925 and European Pat. No. EP0439674 do not address the issue of recovering mixed cullet.

Further, because there are inherent limitations associated with conventional MRF processing techniques, such as manual sorting, that are used to sort glass by color, contaminants will not be completely removed from the glass stream. Contaminants that remain in the glass stream may cause quality and safety issues in finished glass products. For example, ceramic impurities remaining in the glass stream may adversely affect the glass recycling and manufacturing process, as well as the structural integrity of the finished glass product. Thus, there is a need to improve the cleanliness of glass recovered from the recycling process.

Finally, due to the implementation of single stream collection methods, glass is being broken at a substantially higher rate throughout the collection process. As a result, a much higher percentage of mixed cullet is being produced, with much of the increased production not being able to be recycled using conventional MRF processing techniques.

We have thus determined that it would be generally beneficial to increase and/or improve the profitability associated with recycling glass. In particular, we have determined that it would be beneficial to be able to improve the profitability associated with recycling mixed cullet. We have determined that it would be beneficial to increase the yield of glass recovered from the recycling process. We have further determined that it would be beneficial to be able recycle glass without having to sort the glass by size and/or color. In addition, we have determined that eliminating the need to sort glass by size and color advantageously decreases the labor, equipment, and equipment maintenance costs associated with recycling glass. In addition, we have determined that it would be generally be beneficial to be able to increase the cleanliness of the mixed cullet recovered from the recycling process, such as by removing ceramics prior to transporting the mixed cullet to a beneficiator or glass plant.

We have discovered new and useful ways of utilizing, for example, one or more optical sorters in connection with a single stream MRF. In particular, we have discovered that the use of optical sorters can, for example, reduce labor costs, provide for increased automation and thereby improve efficiency of sorting, increase the quality of sorted material, and generally increase profitability by increasing recovery rates. We have also discovered that there is a need to utilize one or more optical sorters to collect, track, and process constituent data of at least some recyclable material in a manner that, for example, enables MRF operations to be modified in a manner that facilitates improved processing efficacy and profitability.

LIST OF FIGURES

DESCRIPTION OF EMBODIMENTS OF THE INVENTION

Embodiments of the present invention provide recycling systems and methods that can recover and process all (or substantially all) of the glass portion of an incoming stream of commingled recyclables for eventual use as material for, e.g., bottle manufacturing, without having to sort the glass by size and/or color. The resulting glass can be used, for example, in connection with de-coloring/coloring technology, such as described in U.S. Pat. No. 5,718,737, entitled, "Method of Recycling Mixed Colored Cullet into Amber, Green, or Flint Glass," U.S. Pat. No. 6,230,521, entitled, "Method of Recycling Batches of Mixed Color Cullet into Amber, Green, or Flint Glass with Selected Properties," and/or U.S. Pat. No. 6,763,280, entitled, "Automated Process for Recycling Batches of Mixed Color Cullet into Amber, Green, or Flint Glass with Selected Properties," each of which are incorporated herein by reference.

Embodiments of the present invention also provide an automated or substantially automated single stream material recovery facility (MRF) recycling systems and associated methods that recover and processes, for example, all (or substantially all) of the paper, glass, plastics, ferrous, and/or non-ferrous content of an incoming single stream of recyclable material for eventual use as manufacturing material by MRF customers. Embodiments of the present invention reduce labor costs, provide for increased automation and thereby improve efficiency of sorting, increase the quality of sorted material, and generally increase profitability by increasing recovery rates.

In addition, embodiments of the invention also enable MRFs to collect data, such as the rate at which, for example, fiber and/or glass material is being processed. The data can enable or facilitate, for example, MRFs to better track and/or improve the efficiency of internal processes, as well as realize improved prices and/or profit margins for recycled products. For example, data such as glass composition data can be collected to facilitate glass plant operation. In addition, data pertaining, for example, to the color composition of plastic bottles within a processed resin bale (e.g., the volume of green polyethylene terephthalate (PET) bottles and/or higher-value clear PET bottles for the day, week or month) can be determined. This data can be used to enable a mill to better manage its blending process.

Figure 1A:
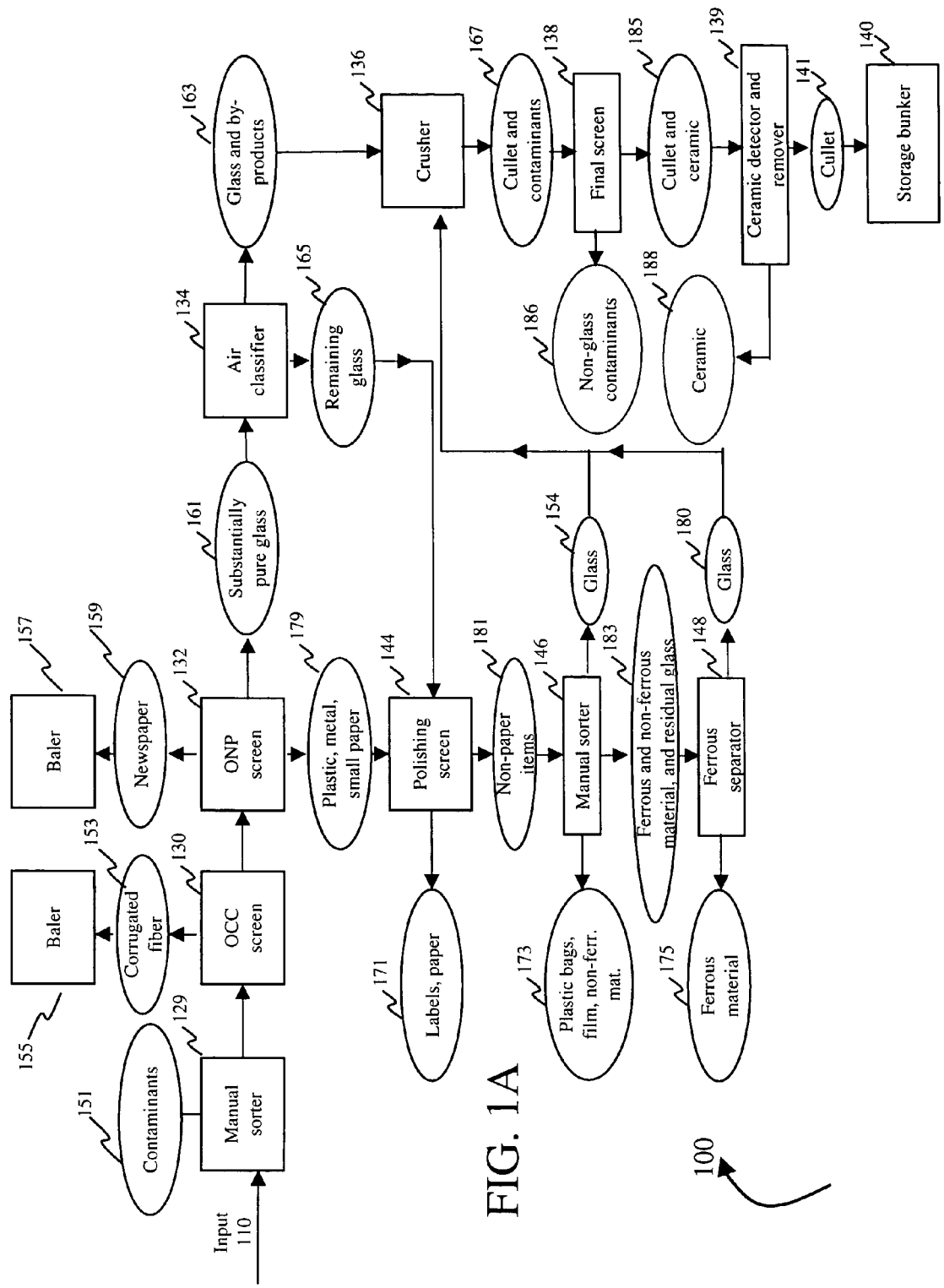
FIG. 1A is a block diagram of an exemplary embodiment of a single-stream glass recycling system that can process glass of mixed color and size.

FIG. 1A, generally at 100, illustrates a block diagram of an exemplary single-stream glass recycling system in accordance with an embodiment of the present invention. The system 100 includes an input 110, and standard techniques and equipment such as one or more manual sorters 129, an Old Corrugated Containers (OCC) disc screen 130, an Old Newsprint (ONP) screen 132, an air classifier 134, a crusher 136, a final screen 138, a ceramic detector and remover 139, and/or a storage bunker 140. System 100 can also include a polishing screen 144, a manual sorter 146, and/or a ferrous separator 148. Numerous arrangements of the various techniques and equipment can be utilized. In addition, not all techniques and equipment described above need be utilized in all embodiments.

Input 110 is a supply stream to system 100 that can include, for example, mixed colored (e.g., flint, amber and/or green) glass that is commingled with plastics, metals and/or fibers such as newsprint, corrugated paper, office paper, junk mail material, and the like. In general, input 110 will generally have three types of recyclable and non-recyclable material, in addition to glass: organic material, ceramic material, and metals.

First, organic material may include items such as, for example, cardboard boxes, paper bags, newspaper, paper and plastic labels, plastic containers and caps, cork, wood debris, plants and/or food residue. Second, ceramic material may include items such as dishware, porcelain caps, pottery, heat resistant cookware (e.g., Pyrex®), mirror glass, laboratory glass, light bulbs, crystal, window glass, bricks, concrete, as well as stones and dirt.

Third, metals are either ferrous or non-ferrous, and typically appear within input 110 in the form of container lids or seals. Typical ferrous metals include iron and steel. Typical non-ferrous metal contamination includes brass, aluminum, lead, and stainless steel items.

Manual sorter 129 can be one or more human workers who sort input 110 by hand, picking out large and/or obvious contaminants such as milk cartons, take-out cups, broken or worn out devices, light bulbs, and/or styrofoam. In operation, one or more transport mechanisms such as a conveyor can be used to provide input 110 to manual sorter 129 and to the remainder of system 100. As the input 110 is fed onto the transport mechanism (e.g., a conveyor belt), vibratory motion typically is used to spread the waste out onto the belt for ease of observation. One or more manual sorters 129 can be utilized on one or both sides of the moving conveyor belt to hand sort through input 110, and remove the contaminants from input 110.

OCC disc screen 130, ONP screen 132, final screen 138, and polishing screen 144 are standard automated screening mechanisms that are configured to mechanically separate recyclables into separate categories, such as OCC, ONP, ferrous material and non-ferrous material. Screening is employed to separate materials of different sizes into two or more size distributions. Screens will function to separate oversized and undersized materials as a pre-processing technique for other unit operations within system 100. The types of screens that can be used in system 100 are, for example, disc screens and trommels.

Figure 8A:
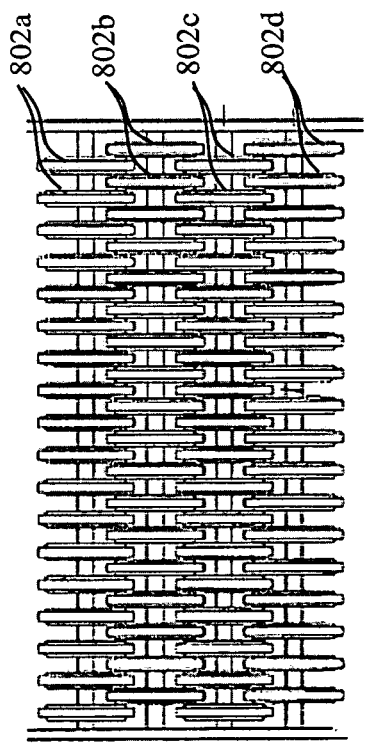
FIG. 8A is an exemplary top view of a disc screen used in various embodiments of the present invention.
Figure 8B:
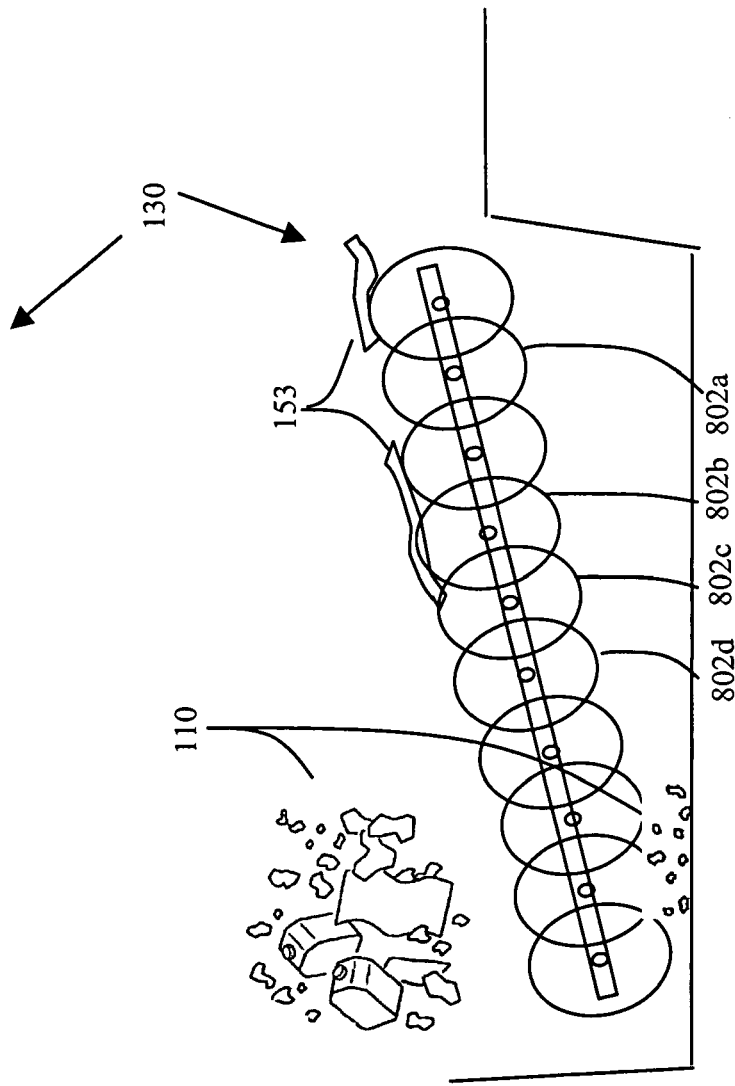
FIG. 8B is an exemplary side view of a disc screen shown in FIG. 8A.

Input 110 proceeds to OCC disc screen 130, which screens out, for example, paper, bags, and corrugated fiber 153 from input 110. OCC disc screen 130, an embodiment of which is further illustrated by FIGS. 8A and 8B (FIG. 8A being a top view and FIG. 8B being a side view), can include a plurality of discs (e.g., rows of discs 802*a*, 802*b*, 802*c*, 802*d*, as illustrated in FIGS. 8A and 8B) that rotate and impart, for example, a wavelike motion that causes larger object such as OCC 153 to move upwards, away from the remainder of input 110. An OCC disk screen such as manufactured by CP Manufacturing Inc., National City, Calif., may be used. Preferably, an OCC disk screen will be utilized that removes mixed and office paper from OCC. The OCC disk screen can utilize, for example, serrated elliptical disks made out of ½-inch thick steel plate. Preferably, the size of the disks can be changed, and the space between disks or rows of disks can be varied to adapt to the stream of material.

The main design concept and operating principle of a screener is to remove valuable recyclables such as paper, bags and corrugated fiber 153 negatively off the end of the conveyor system. This reduces the need for labor-intensive removal by positively picking the material from input 110, though one or more manual sorters 129 may be utilized to inspect the material and remove miscellaneous contaminants.

Baler 155 compacts the paper, bags and corrugated fiber 153 received from OCC disk screen 130, and wraps the paper, bags and corrugated fiber 153 into volumes (e.g., cubes) called bales. A wire or strap is typically used to secure the baled material. The bales can be sent, for example, to local, national, and global reprocessors in order to be made into new recycled products. A baler such as the Apollo TR-7/30 model, manufactured by Marathon Equipment Company, Vernon, Ala., can be used.

Figure 9:
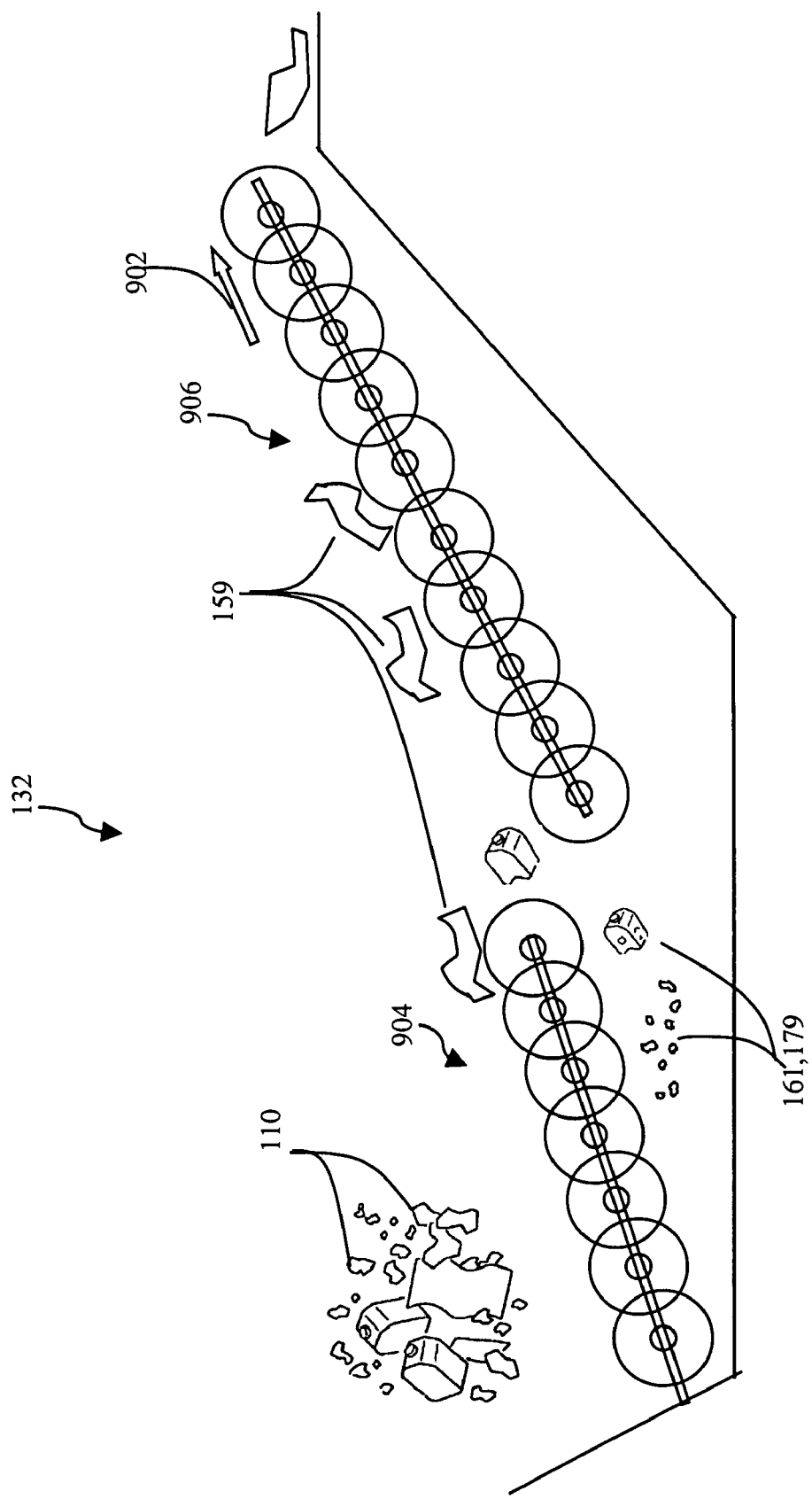
FIG. 9 is an exemplary side view of a dual screen separator used in various embodiments of the present invention.

The remainder of input 110 proceeds from OCC disk screen 130 to ONP screen 132. In an exemplary embodiment, as shown in FIG. 9, ONP screen 132 can be a standard dual screen separator, which pulls newspapers and standard newspaper inserts 159 from input 110 through its upper deck 906 in the direction of arrow 902, and separates out the bulk of glass and cullet from the rest of input 110 through, for example, one or more decks (e.g., lower deck 904). The plastics, metals, small paper products and/or remaining glass 179 are directed to polishing screen 144, whereas the substantially pure glass stream 161 proceeds to air classifier 134.

In addition, baler 157 compacts the newspaper 159 received from ONP screen 132, and bales the newspaper 159. A baler such as the Apollo TR-7/30 model, manufactured by Marathon Equipment Company, Vernon, Ala., can be used. As an alternative, baler 155 can be used in sequence to respectively to bale both the paper, bags and corrugated fiber 153 received from OCC disk screen 130 and the newspaper 159 received from ONP screen 132.

In general, a disc screen utilizes a plurality of flat screens that consist of an array of disks that spin on shafts. The spinning moves the materials across the screen by means of the disc rotation, which allows materials to be fed directly onto the screen. This feature advantageously makes the disc screen less likely to cause glass breakage compared to other screens. The disc screen can also provide adjustability in opening size, and be self-cleaning. Disc screens are most effective when the fine material to be removed is denser than the larger materials, when the larger materials are relatively rounded and will not prevent passage of the fines to the screen, and when breakage could be a problem.

An ONP screen 132 such as NEWScreen™, manufactured by CP Manufacturing Inc., National City, Calif., may be used. Preferably, an ONP screen will be utilized that removes newspaper 159 from mixed paper, co-mingled containers, dirt and debris.

Air classifier 134 can be a standard air classifier that separates materials, such as small pieces of plastic, aluminum, and paper from the glass stream. Air classifier 134 removes at least a substantial portion of any remaining impurities, such as small pieces of paper, from substantially pure glass 161. An air classifier, such as model AC 10 or AC 78, manufactured by CP Manufacturing, National City, Calif., may be used.

In an embodiment, air classifier 134 uses low-velocity airflows to clarify substantially pure glass 161 and augment standard high-velocity air-knife procedures. Relatively high-velocity air generated by a primary suction fan with sufficient air volume can be used for general conveying purposes of the initial mixed fraction taken off substantially pure glass 161. A light mixed faction can be first lifted off substantially pure glass 161 by an air pickup unit. Air velocities within air classifier 134 are controlled at a lower velocity to allow selective pickup. Materials not selected for pickup remain on the conveyor belt. Once in the separation chamber of air classifier 134, the material is subject to, for example, two separate pressure drops. Items heavier or denser than, for example, remaining glass 165, and loose paper or plastic film drop out, allowing for recovery of plastic and light metallic items, which can be transported to polishing screen 144.

The glass and by-products that leave air classifier 134 can proceed to crusher 136, which is a standard glass crusher that crushes received glass into approximately 0.5-2.5 inch size pieces. If crusher 136 is not utilized, the glass and by-products 163 can proceed from air classifier 134 to final screen 138. A crusher such as model HMG-40, manufactured by C.S. Bell Co., Tiffin Ohio, may be utilized.

Final screen 138 removes all, or substantially all, of any remaining non-glass contaminants from crushed glass 167 (e.g., cullet) that leaves crusher 136. Final screen 138 removes non-glass contaminants 186 such as small plastic and/or metal cans and/or lids that are too dense to be removed by air classifier 134, and/or too malleable to be size reduced by crusher 136. For example, equipment such as a V-Screen™ Separator, from CP Manufacturing, Inc., National City, Calif., can be used to perform the final screening.

Ceramic detector and remover 139 can be a standard ceramic remover that removes ceramic 188 pieces that are approximately 0.5-2.5 inches in size from cullet and ceramic 185. In one embodiment, as glass enters ceramic detector/remover 139, the glass passes over a plate that is embedded with fiber optic cables. A pulsing light (usually visible light) is projected through the glass to the fiber optic cables, which detect the position of any opaque material. Ceramic detector/remover 139 then utilizes "air knives" to remove ceramic material from glass processing module 132 with a burst of air. It is preferred that crusher 136 be utilized in conjunction with ceramic detector/remover 139, as ceramic detector/remover 139 is more efficient when smaller pieces of glass are being processed. A ceramic detector/remover such as a type 6000 KSP Separator, manufactured by Binder & Co. AG, Gleisdorf, Austria, may be used.

The cullet and ceramic 185 is fed into ceramic detector and remover 139 by, for example, a vibrating conveyor belt, which keeps the cullet and ceramic 185 in a thin layer. In one embodiment, as the cullet and ceramic 185 enters ceramic detector and remover 139, the glass and ceramic 185 passes over a plate embedded with fiber optic cables. A pulsing light (usually visible light) is projected through the glass and ceramic 185 to the fiber optic cables, which detect the position of any opaque material. Ceramic detector and remover 139 then directs one of a series of "air knives" to remove the ceramic material with a burst of air. It is preferred that crusher 136 be utilized in conjunction with ceramic detector and remover 139 since ceramic detector and remover 139 is more efficient when processing smaller pieces of mixed cullet.

If ceramic detector and remover 139 is not utilized, the remains of cullet and ceramic 185 can proceed from final screen 138 to storage bunker 140, which is a standard industrial storage bin used to store the cullet and ceramic 185 that is sufficiently clean to be shipped to a beneficiator and/or glass plant for further processing. However, it is preferred that ceramic detector and remover 139 be utilized, as ceramic contaminants larger than No. 12 mesh typically do not melt in a furnace that would be utilized by a glass plant, which can result in ceramic inclusions in finished glass containers, and damage to equipment used at a glass plant.

Returning now to ONP screen 132, output 179 from ONP screen 132 that proceeds to polishing screen 144 does not generally contain mixed-cullet, paper, bags, corrugated fiber 153, or newspaper 159. Polishing screen 144 is a standard screening mechanism that screens out all, or substantially all, of any remaining pieces of paper such as labels, and sheets of paper that were not removed by OCC disc screen 130 and ONP screen 132.

Polishing screen 144 carries or lifts output 179 (e.g., a mix of paper and other miscellaneous material) over discs similar to the ONP screen 132 and OCC disc screen 130 removal discs. The discs associated with polishing screen 144, however, are generally smaller in size and more closely spaced together that the discs of ONP screen 132 and OCC disc screen 130. The non-paper items 181 that are carried by polishing screen 144 discs are transported to a conveyor from which manual sorters 146 can remove any remaining non-paper material, such as plastic bags, film and residue items 173. The non-paper items 181 material that are not lifted or carried up by the discs are primarily plastics, metals and whole glass containers that roll off or pass through the discs and discharge onto a transfer conveyor that discharges onto the sorting conveyor. A polishing screen such as the Mach 1 Fiber Sorter, from Machinex Technologies, Inc., Chicago, Ill. can be used. The resulting labels and paper material 171 may be discharged into a storage bunker, and subsequently baled in a conventional manner.

Manual sorter 146 manually sorts out plastics and aluminum (light fraction) 173, which can be subsequently baled or otherwise disposed of. Manual sorter 146 can also sort out glass 154, and provide glass 154 to crusher 136.

Ferrous separator 148 is a standard industrial magnetic or electromagnetic separator that separates ferrous and non-ferrous material 183 from manual sorter 146. The magnetic belt separator can move like a conveyor belt, carrying the materials to a stripper magnet for controlled discharge of ferrous material 175. It is preferred that a stainless steel section be utilized on conveyor installations to facilitate maximum magnet effectiveness. A magnetic drum ferrous separator, such as manufactured by Eriez Magnetics, Erie, Pa., may be used. Glass 180 output from ferrous separator 148 can be provided to crusher 136.

Figure 1B:
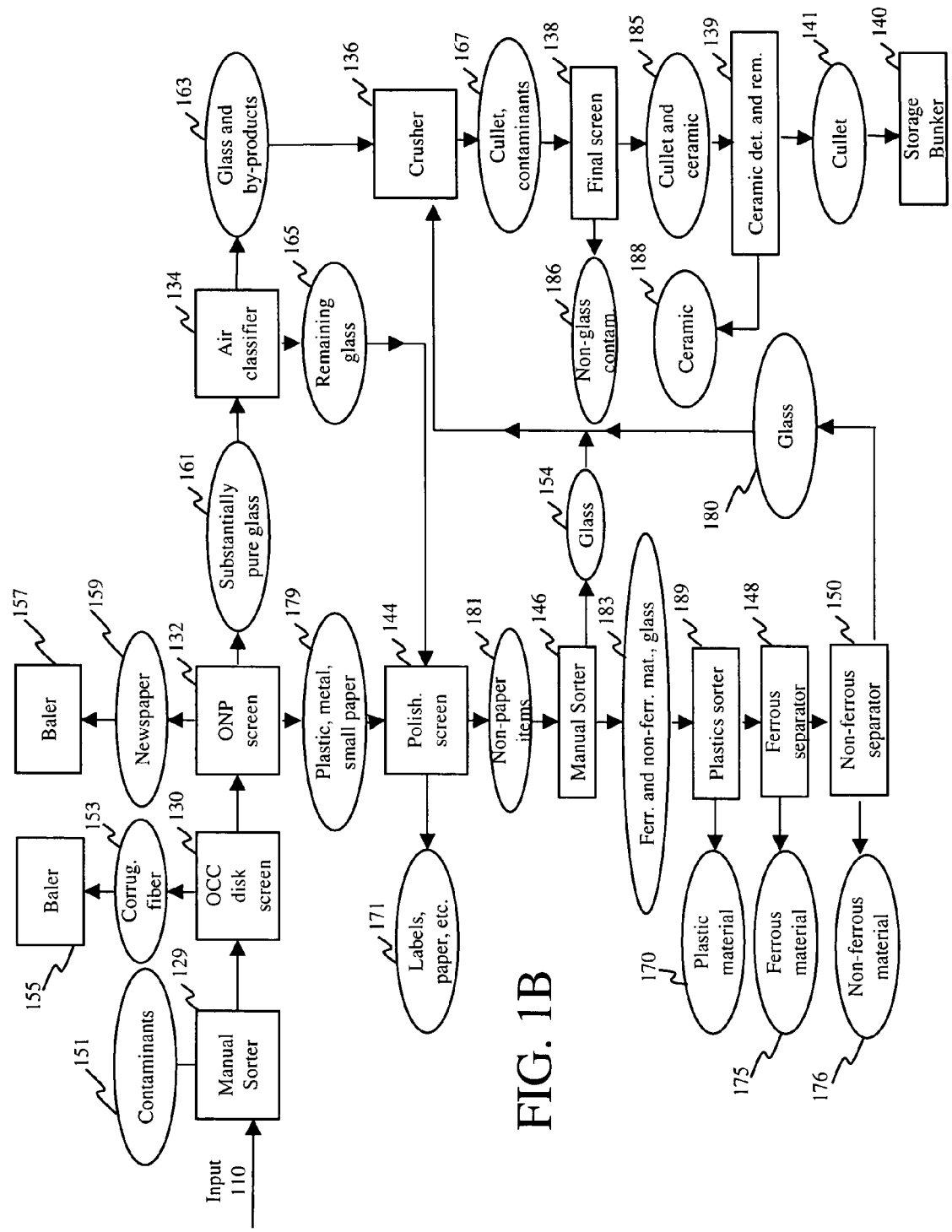
FIG. 1B is a block diagram of a second exemplary embodiment of a single-stream glass recycling system that can process glass of mixed color and size.

In the embodiment shown in FIG. 1B, the light fraction material such as plastic and aluminum containers can optionally be sorted out by using a standard optical sorter 189 to sort plastics, and standard industrial "eddy-current" magnets for aluminum containers 150. An optical sorter such as manufactured by Bender & Co. (Austria), represented in the U.S. by Tomen America (Charlotte, N.C.), may be used.

In FIG. 1B, non-ferrous separator 150 is a standard industrial non-ferrous separator, such as an eddy-current separator, which separates non-ferrous metal, such as aluminum cans and rings, and/or brass, copper, magnesium, and zinc items from the remainder of input 110 (e.g., remaining plastics). Any glass 180 remaining after passing through non-ferrous separator 150 can be provided to crusher 136 for processing, or to a storage bunker.

An eddy-current separator works through the principle of high-frequency oscillatory magnetic fields, which induce an electric current in a conductive object such as an aluminum can. The oscillating fields can be adjusted to optimize separation. This electric current generates a magnetic field, which causes the object to be repelled away from the primary magnetic field. Conductive particles can be fed either directly into the non-ferrous separator's 150 rotating drum or onto a belt enveloping the drum. A non-ferrous separator such as the Type "M" eddy current separator manufactured by Eriez Magnetics, Erie, Pa., may be used.

Plastics sorter 189 receives the ferrous and non-ferrous material 183, and separates out the plastic material 171. It is preferred that plastic sorter 189 have a sensor for each type of plastic that may be sorted.

The MultiSort® infra red plastic bottle sorting system, from National Recovery Technologies, Inc., Nashville, Tenn., may be used. The MultiSort® sorter can separate high density polyethylene (HDPE), polyethylene terephthalate (PET or PETE), polystyrene (PS), polypropylene (PP), and polyvinyl chloride (PVC) bottles, remove contaminant polymers such as PVC and PS from PET bottles, and recover PET bottles from a PVC eject stream produced by x-ray based sorters such as the VinylCycle® system (also manufactured by National Recovery Technologies, Inc., Nashville, Tenn.) during removal of PVC from PET. Numerous variations of FIGS. 1A and 1B will be readily apparent to those skilled in the art. For example, FIGS. 1A and 1B can also be utilized without glass crusher 136. In this case, glass 154 is fed to final screen 138.

Figure 1C:
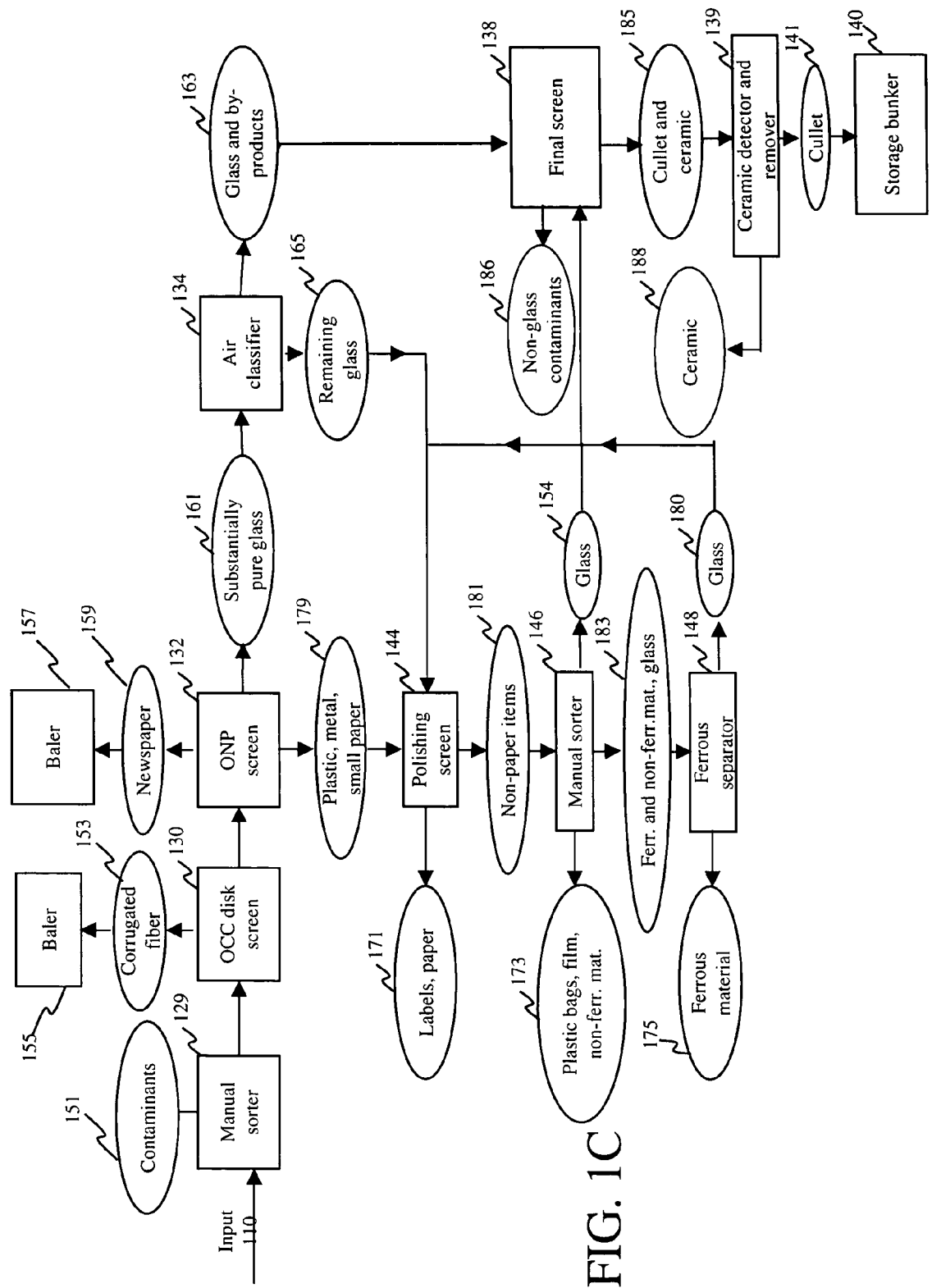
FIG. 1C is a block diagram of FIG. 1A, without a glass crusher.
Figure 1D:
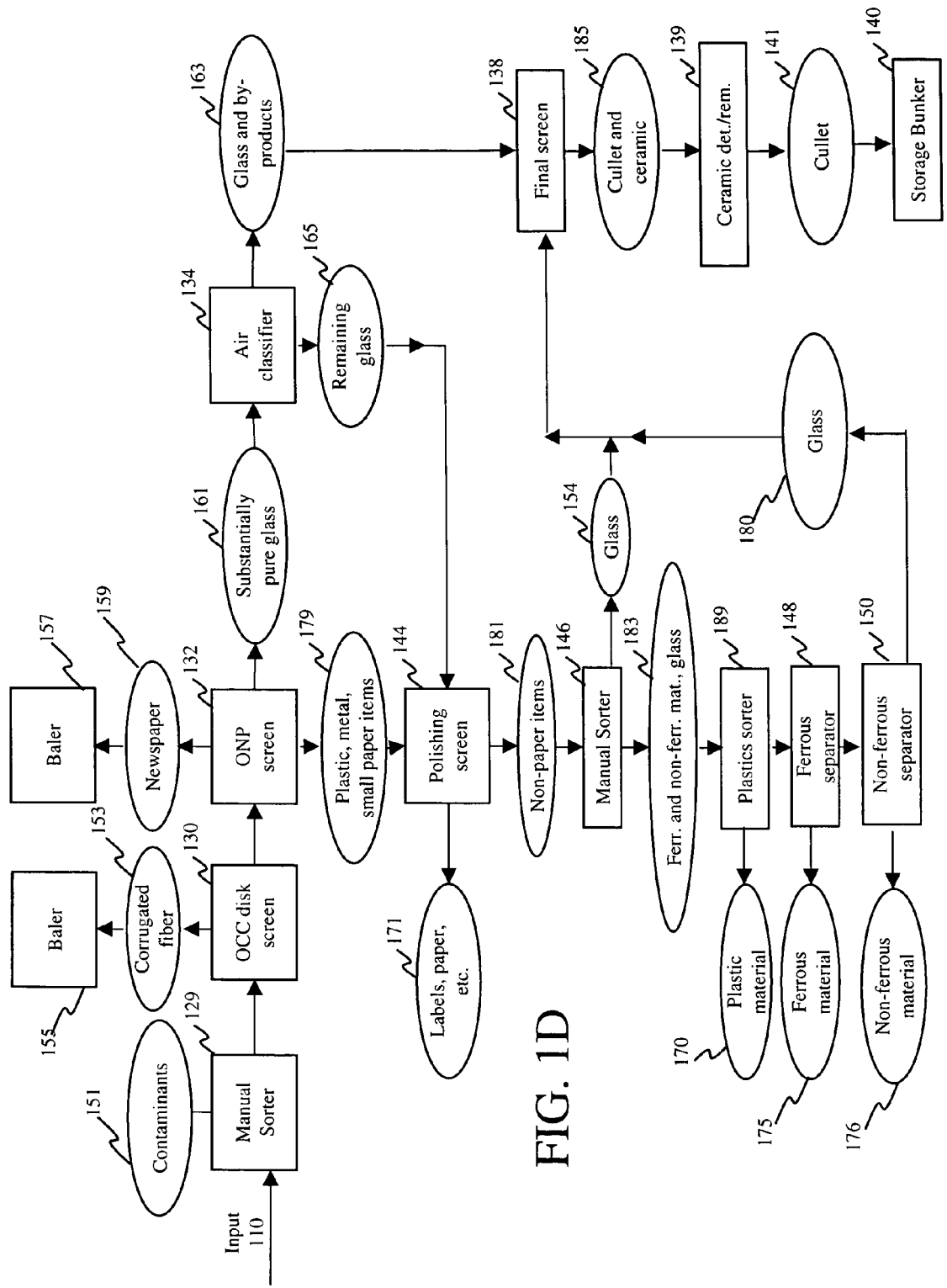
FIG. 1D is a block diagram of FIG. 1B, without a glass crusher.

Accordingly, embodiments of system 100, shown in FIGS. 1A and 1B, can be used to recover mixed cullet in a manner that reduces processing costs because system 100 does not have to sort glass by color, as is done in conventional MRF processing techniques. Further, mixed cullet that was previously considered undesirable due to the difficulty of color-sorting smaller glass pieces, does not need to be discarded as landfill material and/or processed for other less profitable uses. FIG. 1C is an embodiment of FIG. 1A, without glass crusher 136. FIG. 1D is an embodiment of FIG. 1B, without glass crusher 136.

Figure 2:
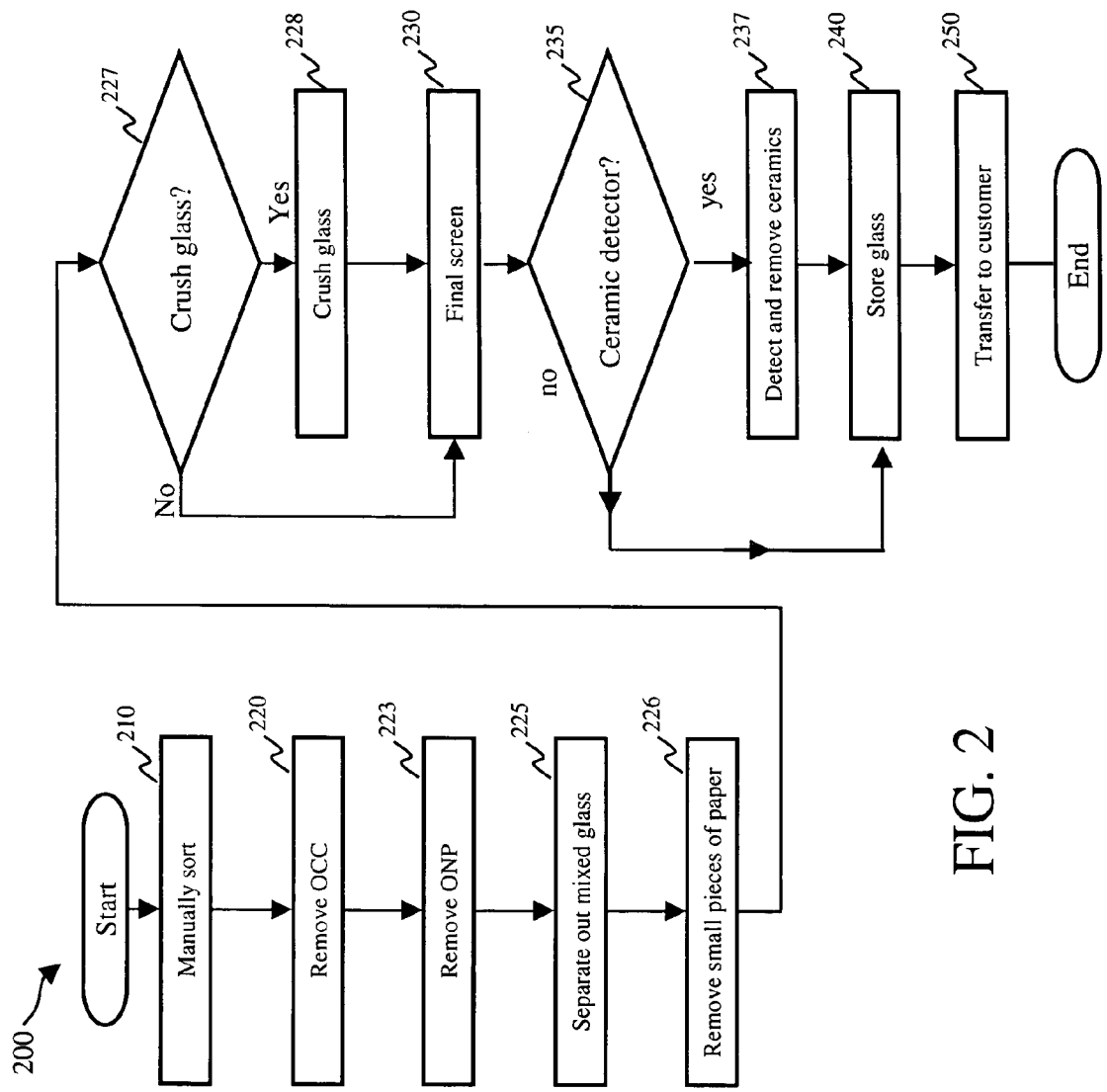
FIG. 2 is a flow diagram of an exemplary method of processing mixed color glass for recycling in a single-stream system.

FIG. 2, generally at 200, illustrates an exemplary method that may include the following sequential, non-sequential, or sequence independent steps for processing mixed colored glass using, for example, the system shown in FIGS. 1A-D. Note that the method described in FIG. 2 is exemplary, and may performed in different orders and/or sequences as dictated or permitted by system 100, and any alternative embodiments thereof. In addition, the method described herein is not limited to the specific use of system 100, but may be performed using any system that is capable of obtaining the material(s) as described in connection with system 100.

At step 210, a single stream of recyclable material, such as glass commingled with plastics, metals, and paper enters system 100. Input 110 can be transported on a conveyor belt, from which manual sorter 129 can remove contaminants, such as plastic bags, flower pots, etc., from input 110.

At step 220, paper, bags and corrugated fiber 153 is removed from the remainder of input 110 by OCC disc screen 130. The glass in the remainder of input 110 falls between the discs, typically back onto a conveyor belt.

At step 223, newspaper 159 is removed from input 110 as it passes through ONP screen 132. At step 225, substantially pure glass 161 is separated from the remainder of input 110. Container items such as commingled plastic and metal containers, and glass greater than approximately 2.5 inches 179, are transported to polishing screen 144.

At step 226, air classifier 134 removes small pieces of paper from the substantially pure glass 161. At decision step 227, an operator can decide whether to crush the mixed cullet into a smaller and/or more uniform size. If the glass and by-products 163 is not crushed, it proceeds, as is shown in FIGS. 1C and 1D, to final screen 138 at step 230, which removes all or substantially all remaining non-glass contaminants 186. If the glass and by-products (FIGS. 1A and 1B) are crushed, at step 228 crusher 136 crushes the glass and by-products into crushed glass 167, after which the crushed glass 167 is transported to final screen 138.

If at decision step 235 a ceramic detector 139 is utilized, the cullet and ceramic 185 (FIGS. 1A-1D) proceeds to the ceramic detector 139 at step 237, storage at step 240, and transfer to a customer at step 250. If at decision step 235 a ceramic detector is not utilized, the cullet and ceramic 185 proceeds is stored at step 240. At step 250, the mixed cullet is transferred to a customer, such as a beneficiator.

Figure 3:
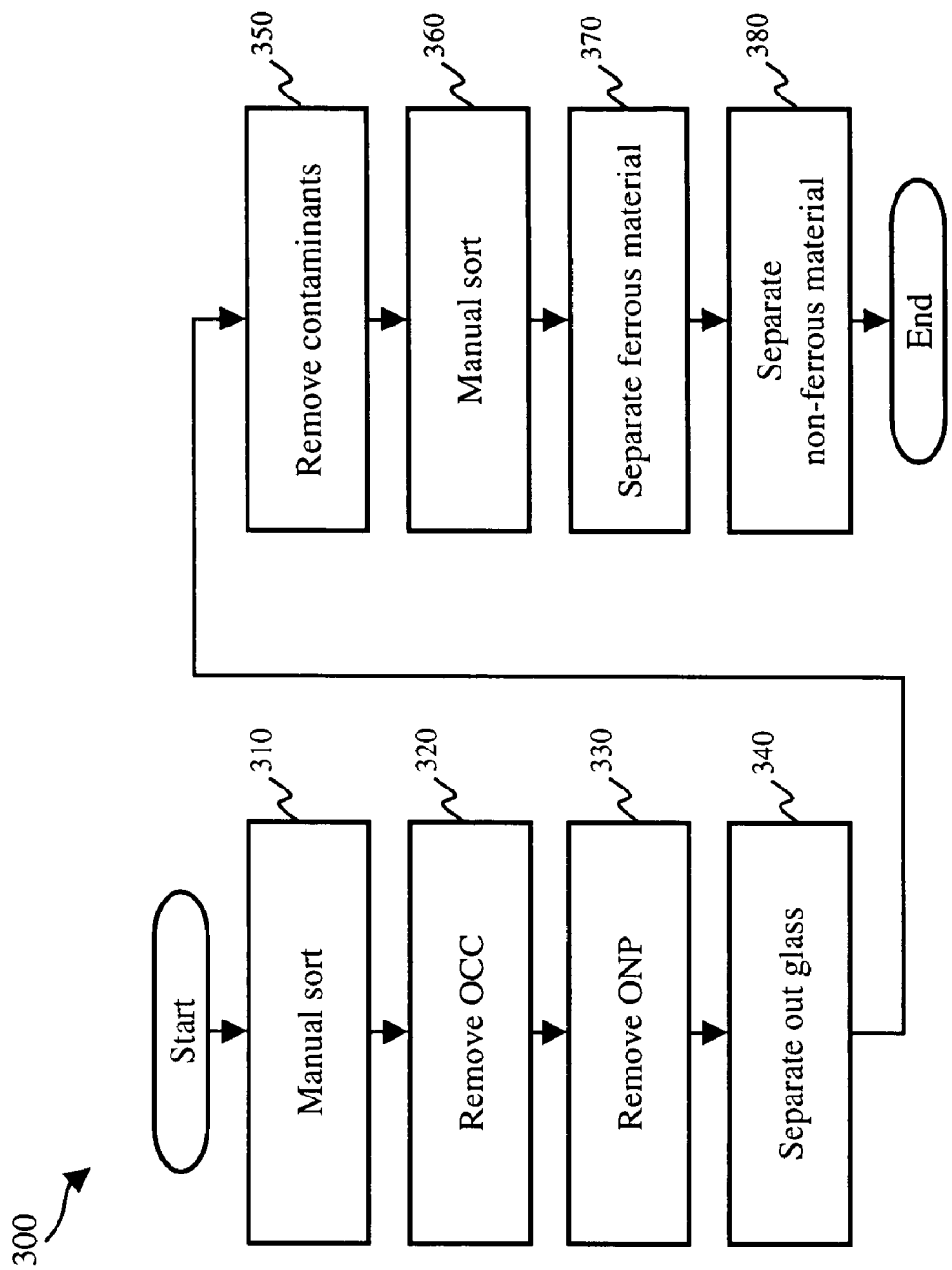
FIG. 3 is a flow diagram of an exemplary method of separating and processing commingled containers in a single-stream system.

FIG. 3, generally at 300, illustrates a method 300 that may include the following, sequential, non-sequential, or sequence independent steps for separating and processing plastic and/or metal items under a single-stream MRF glass recycling system 100. Note that the method described in FIG. 3 is exemplary, and may performed in different orders and/or sequences as dictated or permitted by system 100, and any alternative embodiments thereof. In addition, the method described herein is not limited to the specific use of system 100, but may be performed using any system that is capable of obtaining the material(s) as described in connection with system 100.

In operation, a single stream of recyclable material that includes container material and fiber material enters system 100. At step 310, manual sorter 129 separates out contaminants 151, such as plastic bags, flower pots, etc., from input 110.

At step 320, paper, bags, and corrugated fiber 153 is removed from input 110 by OCC disc screen 130. At step 330, newspaper 159 is removed from the remainder of input 110 as it passes through ONP screen 132. At step 340, substantially pure glass 161 to air classifier 134. The plastic, metal and small paper items 179 are directed to polishing screen 144.

At step 350, polishing screen 144 removes contaminants such as labels and paper 171 that did not get removed by OCC disc screen 130 and ONP screen 132. At step 360, manual sorter 146 performs a manual sort of the non-paper items 181. In another embodiment, such as shown in FIG. 1B, optical sorting equipment 189 can be used to remove plastics from ferrous and non-ferrous materials 183.

At step 370, ferrous separator 148 removes or substantially removes ferrous material from the ferrous and non-ferrous material 183. At step 380, as shown in FIG. 1B, non-ferrous separator 150 extracts any remaining non-ferrous materials, such as aluminum and/or plastic. Non-ferrous separator 150 can be an eddy current separator and/or an optical sorter that can sort plastic. Any glass remaining within the remainder of input 110 after passing through non-ferrous separator 150 can be removed and placed in storage bunker 140. The glass 150 can also optionally be fed to and processed by either or both of crusher 136 and/or ceramic detector and remover 139, as described above.

Dual Commingled-stream MRF Glass Recycling System

Figure 4:
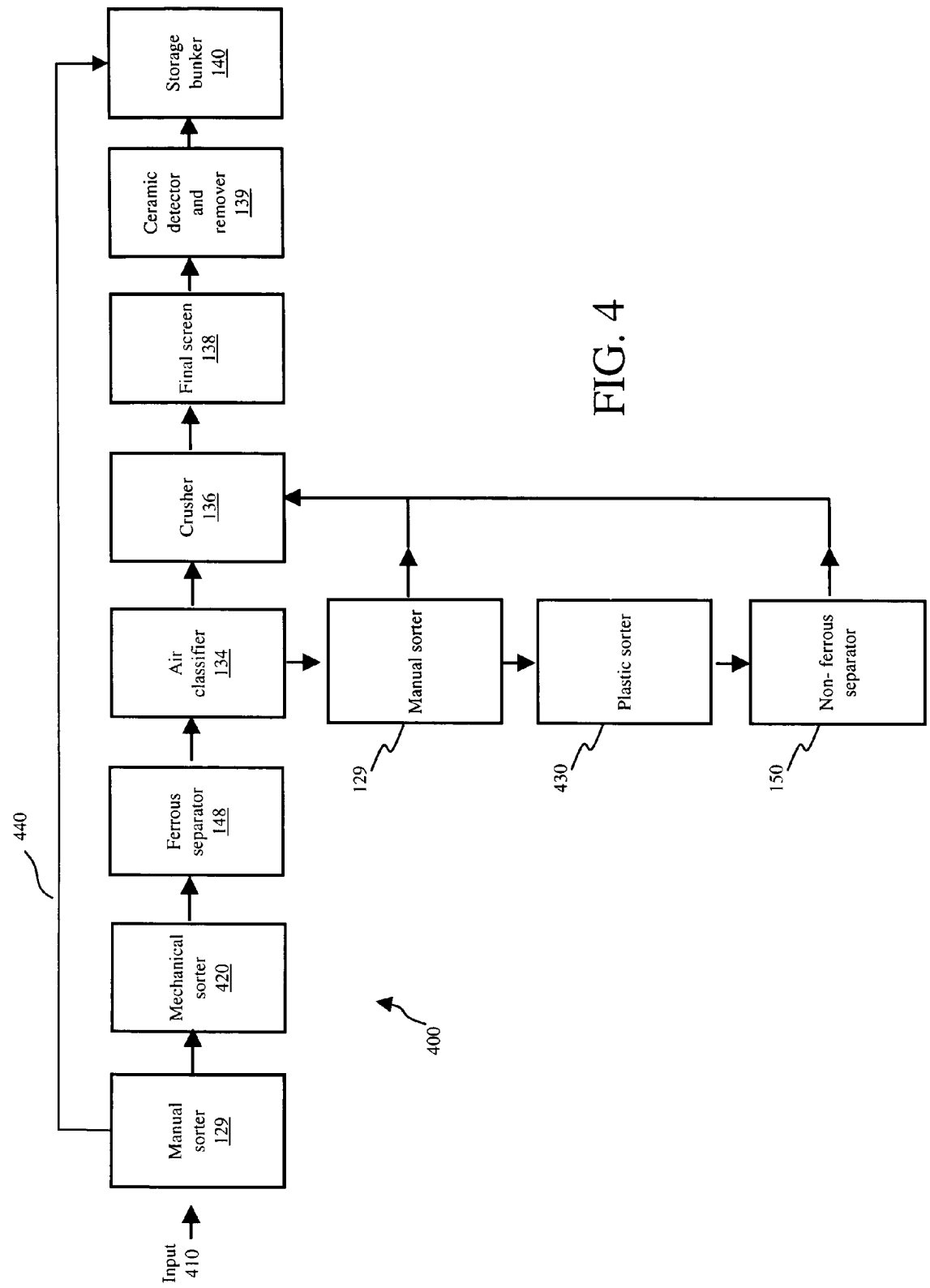
FIG. 4 is a block diagram of an exemplary dual-commingled stream glass recycling system that can process glass of mixed color and size.

FIG. 4, generally at 400, illustrates a block diagram of an exemplary dual-commingled-stream MRF glass recycling system. System 400 differs from single-stream glass recycling system 100 in that system 100 sorts through an input stream that includes fiber material and container material, whereas input 410 does not contain fiber material. Input 410 thus generally includes glass commingled with plastics and metals, and various non-recyclable items.

System 400 can use standard equipment such as a mechanical sorter 420, a ferrous separator 148, a non-ferrous separator 150, an air classifier 134, a crusher 136, a final screen 138, and/or a storage bunker 140. Numerous arrangements of the various equipment can be utilized. In addition, not all equipment described above need be utilized in all embodiments.

A conveyor belt can be used to transport input 410 to manual sorter 129. Manual sorter 129 can remove contaminants, such as plastic bags, flower pots, etc., from input 110. The remains of input, which may include, for example, plastics, ferrous and non-ferrous metals, mixed cullet, and glass greater than approximately 2.5 inches in size, proceeds to mechanical sorter 420, which separates out the mixed cullet. Mechanical sorter 420 can be a standard trommel or disc screen. A trommel is a rotating cylindrical screen that is inclined at a downward angle with the respect to the horizontal. Material is fed into the trommel at the elevated end, and the separation occurs while the material moves down the drum. The tumbling action of the trommel effectively separates materials that may be attached to each other. Sorter 420 can also be used to crush glass material to provide additional mixed cullet.

Transport 440 (e.g., a conveyor) can transport the mixed cullet to storage bunker 140. The remaining material of input 410, including pieces of glass larger than approximately 2.5 inches, then passes through ferrous separator 148, which removes all or substantially all of the ferrous material from the remainder of input 410. After the ferrous material is removed, the remainder of input 410 proceeds to air classifier 134, which can use air jets to "blow off" plastic and aluminum materials (light fraction) from the glass. The light fraction proceeds to manual sorter 129, whereas glass greater than approximately 2.5 inches proceeds for crusher 136, if used, or final screen 138 if crusher 136 is not used.

Crusher 136 can be used to break the remaining glass down to a substantially uniform size (e.g., approximately 2.5 inches). The crushed glass is then screened by final screen 138 for remaining contaminants. Ceramic detector and remover 139 can also be used to detect and remove ceramic in the crushed glass. The crushed glass can be stored in a storage bunker 140, along with the glass that was transported from mechanical sorter 420 by transport 440.

The plastic and aluminum items, and associated contaminants diverted by air classifier 134, can proceed to one or more manual sorters 129 that separate the plastic and aluminum items. A plastic sorter 430, such as an optical sorter, can also be used to separate out plastics. In addition, non-ferrous separator 150 can be used to separate out the aluminum items. At least manual sorter 129, plastic sorter 430 and non-ferrous separator 150 are optional. Furthermore, manual sorter 440, plastic sorter 430 or non-ferrous separator 150, if used, can be used in any combination.

In one embodiment, if mechanical sorter 420 crushes all or substantially all of the glass into pieces of a suitable size, air classifier 134, crusher 136, final screen 138, and/or ceramic detector 139 can be eliminated, as a glass stream with a higher proportion of contaminants can be used. In the event that air classifier 134 is utilized, the plastic and aluminum items can be respectively processed by, for example, plastics optical sorter 430 and non-ferrous separator 150, as described above. In addition, manual sorter 129 can also be used to facilitate additional separation.

System 400 is thus able to process mixed cullet for use as a recyclable material. Furthermore, system 400 can advantageously reduce transportation, sorting and screening costs because glass does not generally have to be separated by color.

Figure 5:
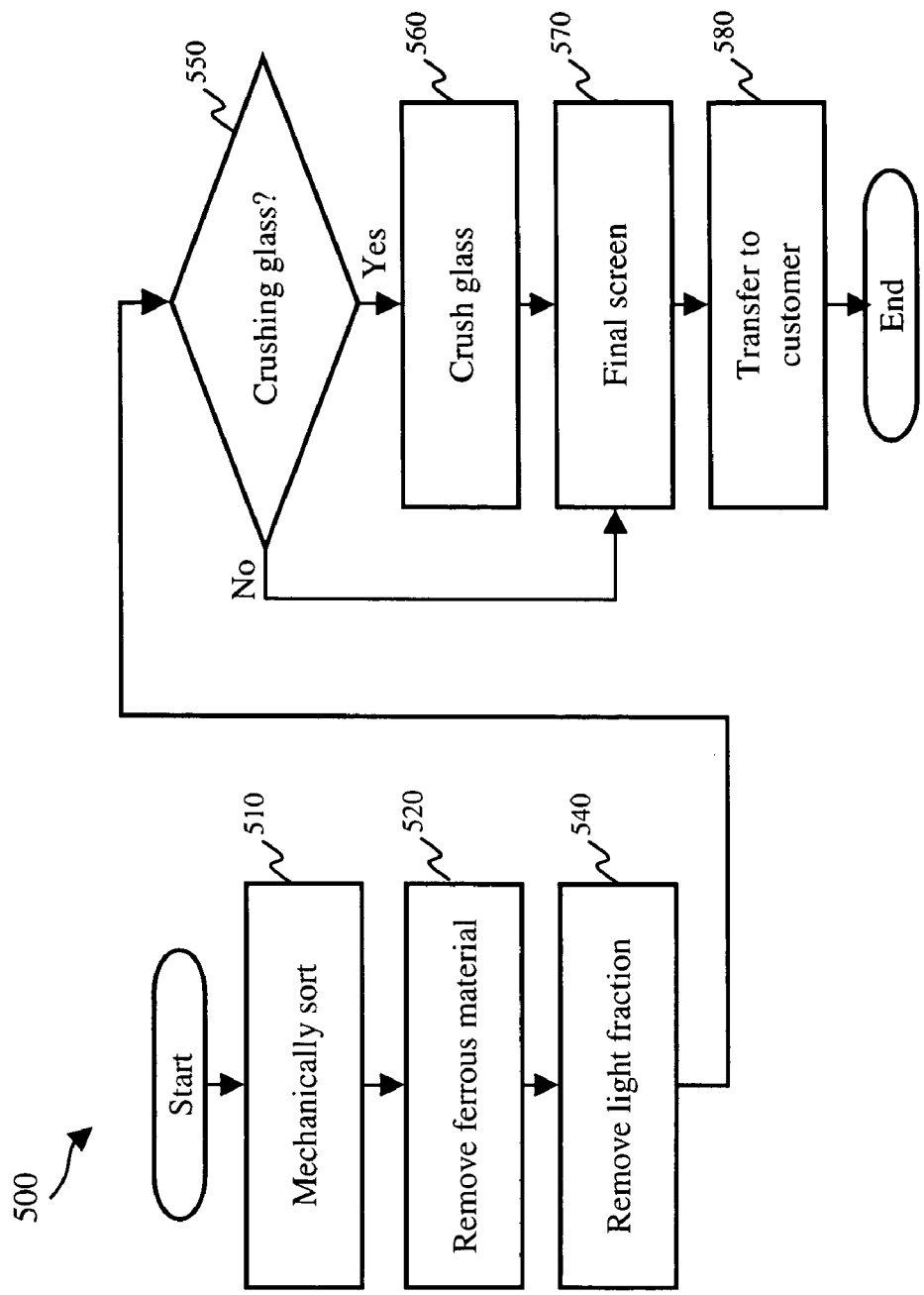
FIG. 5 is a flow diagram of an exemplary method of processing mixed color glass for recycling in a dual-commingled stream system.

FIG. 5, generally at 500, illustrates a method that may include the sequential, non-sequential, or sequence independent steps for processing mixed colored glass supplied to dual-commingled-stream MRF glass recycling system 400. Note that the method described in FIG. 5 is exemplary, and may performed in different orders and/or sequences as dictated or permitted by system 400, and any alternative embodiments thereof. In addition, the method described herein is not limited to the specific use of system 400, but may be performed using any system that is capable of obtaining the material(s) as described in connection with system 400.

Input 410 is placed, for example, on a conveyor that can lead to a station where contaminants are removed by manual sorter 129. At step 510, the remainder of input 410 is processed by mechanical sorter 420. Mechanical sorter 420 separates mixed cullet from plastics, metals, glass greater than or equal to approximately 2.5 inches, and other large non-glass containers. The mixed cullet can be transported from sorter 420 to storage bunker 140.

At step 520, ferrous separator 148 sorts out ferrous material(s) from the remains of input 410. At step 540, air classifier 134 blows different currents of air through the remainder of input 410, to separate light fraction material (e.g., plastic and aluminum containers) out of input 410. The recovered plastics and aluminum can be processed by manual sorter 129, plastic sorter 430 and/or non-ferrous separator 150, as described above.

At decision step 550, if crusher 136 is used, mixed cullet is provided from air classifier 134 to crusher 136. If crusher 136 is not used, the mixed cullet can proceed from air classifier 134 to final screening at step 570, where final screen 138 further removes contaminants from the mixed cullet. Ceramic detector and remover 139 can also be used after final screening step 570 to remove ceramic from the mixed cullet. The mixed cullet can be stored in storage bunker 140, for subsequent shipment to a customer such as a beneficiator or glass plant.

Total Glass Reduction System

Figure 6:
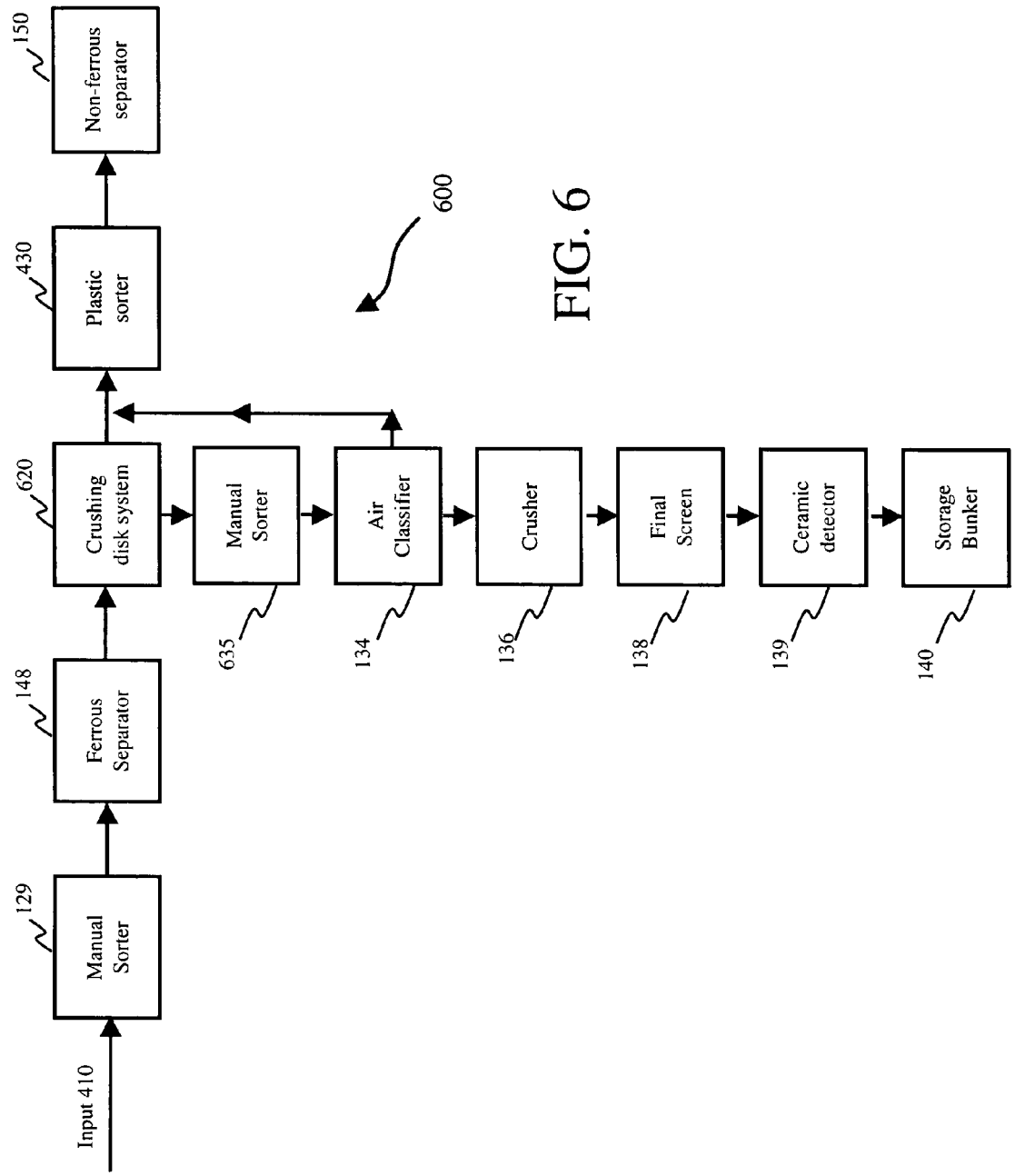
FIG. 6 is a block diagram of an exemplary total glass reduction system.

FIG. 6, generally at 600, illustrates a block diagram of an exemplary total glass reduction system 600. System 600 can include input 410, at least one manual sorter 129, 635, and standard equipment such as ferrous separator 148, a crushing disk system 620, a plastic sorter 430, non-ferrous separator 150, air classifier 134, crusher 136, final screen 138, ceramic detector 139, and/or storage bunker 140. Numerous arrangements of the various equipment can be utilized. In addition, not all equipment described above need be utilized in all embodiments.

Input 410 enters system 600 on, for example, a conveyor belt. Manual sorter 129 can remove trash, plastic bags, flower pots, etc., and ferrous separator 148 can remove ferrous materials from input 410.

Crushing disk system 620 is standard machinery that breaks glass articles into mixed cullet, and separates the mixed cullet from plastic and aluminum articles. A disk crusher such as the Glass Breaker Disc Screen GBDS-2, by CP Manufacturing, National City, Calif., can be used. Manual sorter 635 can remove impurities from the glass received from crushing disk system 620.

Air classifier 134 removes any small pieces of aluminum and/or plastic that were not removed by manual sorter 635. Crusher 136 can be used to further reduce the size of the glass pieces and/or make the glass pieces a more uniform size. Final screen 138 screens out contaminants, such as paper and containers that have not been previously separated from input 410. Ceramic detector 139 can also be used to remove ceramic from the glass stream. Storage bunker 140 can be used to store the processed glass until such time as the glass may be shipped to a beneficiator and/or a glass plant.

The plastic and aluminum that exits crushing disk system 620 proceeds to plastic sorter 625, which removes plastics. Plastic sorter 440 can be an automated process (e.g., a standard machine, such as an optical sorter) or one or more manual sorters. The stream proceeds to non-ferrous separator 150, which removes aluminum items. Non-ferrous separator 150 can be an automated process (e.g., a standard eddy-current separator) or one or more manual sorters. At this point, any remaining elements from input stream 410 can generally be disposed of as waste.

Figure 7:
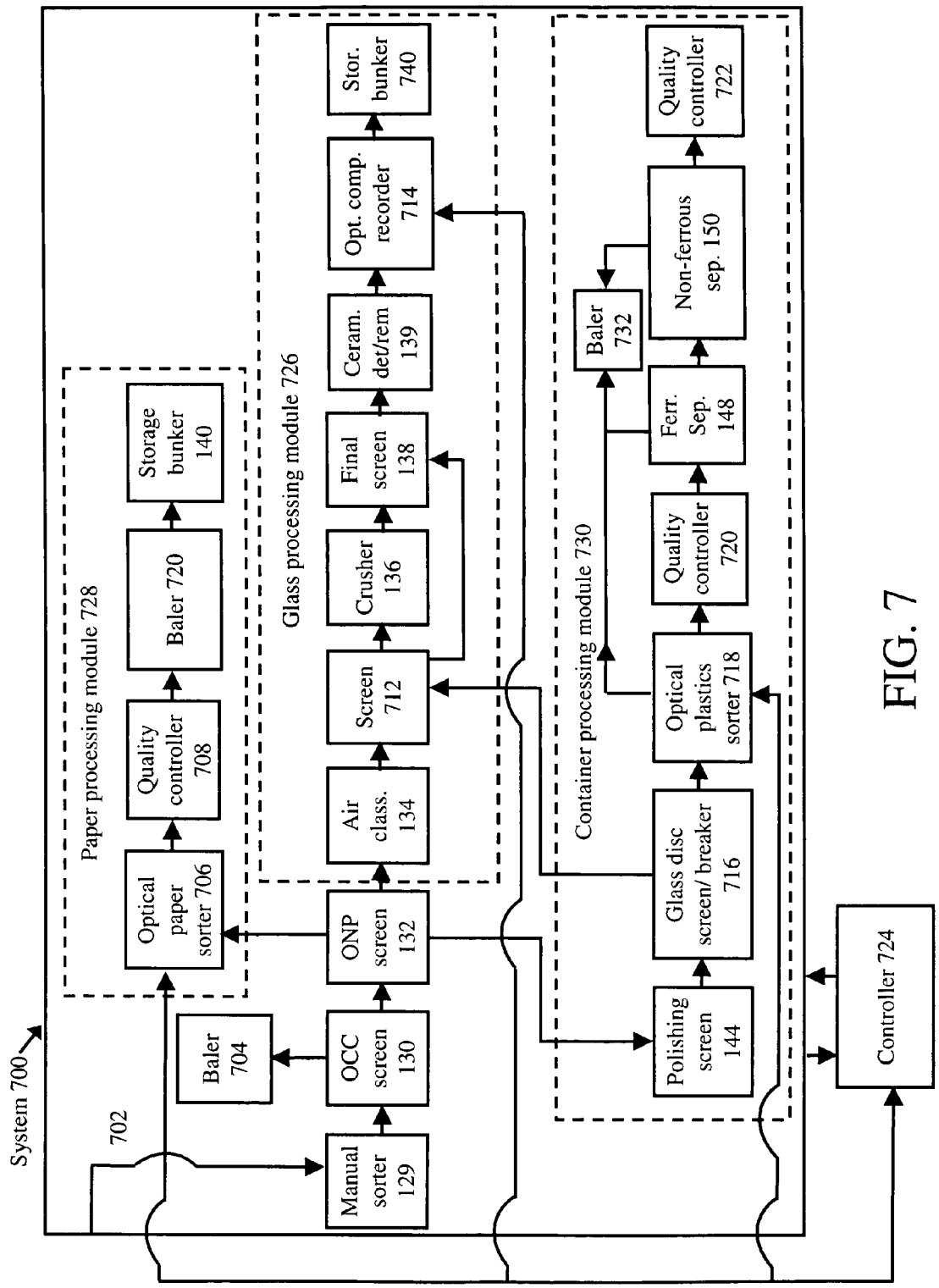
FIG. 7 is a block diagram, also indicating methods of operation, of an exemplary automated single stream glass recycling system utilizing optical sorting techniques.

FIG. 7 illustrates a block diagram, as well as methods of operation, of an exemplary automated single stream glass recycling system 700 in accordance with an embodiment of the present invention. System 700 includes paper processing module 728, glass processing module 726, container processing module 730, controller 724, manual sorter 129, old corrugated cardboard (OCC) screen 130, old newspaper (ONP) screen 132, and baler 704.

Paper processing module 728 includes optical paper sorter 706, quality controller 708, baler 720, and storage bunker 140. Glass processing module 726 includes air classifier 134, screen 712, crusher 136, final screen 138, ceramic detector/remover 139, optical composition recorder 714, and storage bunker 740. Container processing module 730 includes polishing screen 144, glass disc screen/breaker 716, optical plastics sorter 718, quality controller 720, ferrous separator 148, non-ferrous separator 150, quality controller 722, and baler 732. Numerous arrangements of the equipment can be utilized. In addition, not all equipment described above need to be utilized in all embodiments.

In operation, system 700 receives an input stream 702 of recyclable material, through a transport mechanism (not shown) such as a conveyor. Input stream 702 can include, for example, glass, plastics, metals and/or fiber material. Manual sorter 129 can be one or more human workers who sort input stream 702 by handpicking out large and/or obvious contaminants.

Input stream 702 is transported, for example, by a conveyor (not shown) to OCC screen 130, which screens out OCC material from input stream 702. A conveyor (not shown) may also be used to transport OCC from OCC screen 130 to baler 704 for baling. Subsequent to baling, OCC may also be stored, for example, in a bunker (not shown) the same as or similar to bunker 140.

OCC screen 130, screen 712, final screen 138, and polishing screen 134 are standard screening mechanisms that are configured to mechanically separate recyclables, such as OCC, into like categories, as input stream 702 is processed by system 700. Screening is employed to separate materials of different types and sizes. The screens function to separate oversized and undersized materials as a pre-processing technique for other unit operations within system 700. The types of screens that can be used in system 700 are, for example, disc screens, V-screens, and trommels.

Balers 704, 720 and 732 are standard, industrial balers which bale recovered material. A baler such as the Apollo TR-7/30 model, manufactured by Marathon Equipment Company, Vernon, Ala., or model HRB-8, manufactured by Harris Waste Management Group, Inc., Peachtree City, Ga., may be used.

The remainder of input stream 702 falls between the discs of OCC screen 130 and back onto the conveyor belt, where it travels to ONP screen 132. The ONP is transported to paper processing module 728.

The remaining non-paper material falls, for example, through one or more lower decks of ONP screen 132. Glass material is directed to glass processing module 726, whereas the remainder of input stream 702, which is substantially free of glass, OCC, and ONP, is transported to container processing module 730. Any remaining material not sorted out by system 700 can be disposed of at a landfill or an alternative disposal site. ONP screen 132 can be, for example, a standard, dual screen separator which uses an upper deck to remove ONP from input 702. An ONP screen, such as NEWScreen™, manufactured by CP Manufacturing Inc., National City, Calif., may be used.

Turning now to paper processing module 728, a conveyor (not shown) can be used to transport ONP to paper processing module 728. In one embodiment, the conveyor may vibrate and shake out the paper so that it becomes relatively evenly distributed prior to reaching optical paper sorter 706, which is a standard optical sorter that can image the material stream, remove unwanted material from the stream, and/or classify desired material into separate categories that are designated by grade or type.

In another embodiment, multiple conveyors running at different speeds may be used where paper material, such as ONP, travels along a first conveyor running at a slower speed (such as 60 feet-per-minute), before it falls onto a conveyor running at a higher speed (such as 180 feet-per-minute), thus causing the ONP material to spread out on the second, higher-speed conveyor before being imaged by optical paper sorter 706. The sensors within optical paper sorter 706 can generally image the ONP more accurately if the ONP is spread out.

As the ONP material travels along the conveyor belt, optical paper sorter 706 images and sorts out material, such as OCC, which was not removed from OCC screen 1306 An OCC screen such as manufactured by CP Manufacturing Inc., National City, Calif., may be used. The OCC screen can utilize, for example, serrated elliptical disks made, for example, out of ½-inch thick steel plate. Preferably, the size of the disks can be changed, and the space between disks or rows of disks can be varied to adapt to the stream of material. The discs that rotate and impart a wavelike motion that causes larger objects, such as the OCC, to move upwards and away from the remainder of input stream 702.

Mixed paper, glossy advertisements, office paper and the like may also be sorted and removed. In an embodiment, the mixed paper, glossy advertisements and office paper may be stored in a bunker (not shown) prior to baling. The bunker can be located proximate baler 704, baler 720 or another baler (not shown) to suit system 700 capacity and/or operation.

As optical paper sorter 706 sorts and separates the paper material, it also collects data from the sort that includes, for example, the volume of paper processed, the quality of paper processed, and/or the percentage, of ONP processed. An optical paper sorter such as the PaperSort™ System, manufactured by Magnetic Separation Systems Inc., Nashville, Tenn., may be used. The data can be transmitted to controller 724 so that controller 724 can adjust conveyor and/or paper processing module 728 speed(s) and/or operation to facilitate, for example, more efficient tracking and/or processing of ONP. Controller 724 can be a logic-controlled computer software system incorporated within system 700 that controls and collects data from automated optical sorters, such as optical paper sorter 706, optical composition recorder 714 and optical plastics sorter 718. A controller, such as a controller that is used in conjunction with the PaperSort™ system can be used. Controller 724 can also use the collected data to facilitate the internal tracking of system 700, which allows system 700 to make adjustments, for example, to the processing rate of modules 726, 728 and/or 730. For example, controller 724 may increase and/or decrease the processing rate of paper processing module 728, glass processing module 726 and/or container processing module 730. Data collected by controller 724 can be provided, for example, to third parties, such as beneficiators, which can use the data, for example to facilitate blending and mixing of raw materials for batch runs, and/or determine the composition and/or the quality of the product for pricing or batch run purposes. In addition, controller 724 can be used for and/or in connection with obtaining data pertaining to a percent composition of respective materials (e.g., a percent of each color glass and/or a percent of two or more types of plastic), and to evaluate incoming material quality (e.g., determine a percent of contaminants or other impurities), optionally in connection with establishing pricing.

Quality controller 708, quality controller 720, and quality controller 722 can be one or more human workers who visually and/or manually inspect input stream 702 to ensure that the only ONP has been removed and sorted by optical paper sorter, and that the ONP is sufficiently free of contaminants. Contaminants or other material that does not belong in the ONP can be removed.

In one embodiment, ONP material can be baled by baler 720. Bales can be stored, for example, in storage bunker 140 prior to shipping the bales to customers. Storage bunker 140 and storage bunker 740 are standard, industrial storage bunkers that hold recyclable processed material, such as glass, before it is transferred to a customer.

Returning now to OCC screen 130, glass material within input stream 702 falls between the discs of OCC screen 130, onto the conveyor belt, where it is transported to ONP screen 132. Glass material falls through one of the lower decks of ONP screen 132 and is transported to glass processing module 726, while the remaining material of input stream 702 (e.g., plastics, metals, small pieces of paper, and/or remaining glass material) falls through another deck of ONP screen 132 and is directed to container processing module 730. Other methods of separating glass and container material can also be used.

Impurities in the glass are removed by air classifier 134, which uses an air stream to separate material such as small pieces of paper, plastic, aluminum, and other residue. Screen 712 separates glass that is larger than, for example, approximately 2.5 inches from glass smaller than approximately 2.5 inches. Screen 712 may be a standard singe disc screen, or two or more disc screens.

Glass larger than 2.5 inches is crushed by crusher 136 into approximately 0.5-2.5 inch pieces. Final screen 138 removes any remaining contaminants, such as paper, plastic, and/or metals from glass smaller than 2.5 inches. Ceramic detector/remover 139 identifies and removes ceramic contaminants from the glass.

An optical composition recorder 714 may be used in various embodiments. For example, in one embodiment, optical composition recorder may be incorporated with ceramic detector/remover 139. In another embodiment, optical composition recorder 714 may be a separate optical recording device or mechanism. In either embodiment, optical composition recorder 714 records composition data, such as color and contaminant composition of the sorted glass, and transmits the data to controller 724 so that controller 724 can, for example, adjust glass processing module 726 operation to facilitate more efficient tracking and/or processing of glass. An optical composition recorder 714, such as manufactured by Binder and Co., Gleisdorf, Austria, may be used. The data collected by recorder 714 can be used for and/or in connection with determining batch runs and the pricing of cullet. The processed glass can be stored in storage bunker 740, which can be a standard industrial-sized bunker or series of bunkers, to await transfer to customers.

Turning now to container processing module 730, and as preciously noted, the remaining small pieces of paper, glass, metal and plastic material within input stream 702 are directed to container processing module 730 for further sorting and processing.

Polishing screen 144 carries or lifts up small pieces of paper and other miscellaneous material over discs similar to the ONP screen 132 and OCC disc screen 130 removal discs. The discs associated with polishing screen 144, however, are generally smaller in size and more closely spaced together that the discs of ONP screen 132 and OCC disc screen 130.

In one embodiment, the remaining material proceeds to glass disc screen/breaker 716, which can be a two-level disk screen having metal discs. Disc screen/breaker 716 breaks up any remaining glass in container processing module 730. The glass drops on to a metal discs, and is broken by the metal discs. The broken glass then falls through the screens, for example, onto a separate conveyor belt, which transports the glass to screen 712 to be processed through the remainder of glass processing module 132. Preferably, disk spacing will be adjustable to accommodate separation of various materials from the glass.

The material output from glass disc/breaker 716 is transported to optical plastics sorter 718. Optical plastics sorter 718 is a standard optical sorter, which can be programmed to image the material stream, remove unwanted material from the stream, and/or classify desired material into separate categories that are designated by grade or type, such as polyethylene terephthalate (PET), pigmented, and natural plastic articles such as high density polyethylene (HDPE) articles. The sorted plastics can be placed, for example, on three different conveyors. As optical plastics sorter 718 sorts and separates the plastic material, it can also collect data from the sort, which can include volume of plastic processed, quality of plastic processed, and percentage of PET and/or HDPE processed. This data can be used, for example, to determine the amount of green bottles and clear bottles and material size of PET bottles separated. This information, in turn, can be used in connection with determining pricing, and allowing, for example, industry consultants to better understand consumer use in various geographic locations. A plastic sorter 718 such as the Aladdin™ or BottleSort™ systems, each of which provides automated identification and separation of post consumer plastic bottles and are manufactured by Magnetic Separation Systems Inc., Nashville, Tenn., may be used. An ELPAC™ sorter, by Magnetic Separation Systems, Nashville, Tenn., can also be used.

Data is collected by optical plastics sorter 718 and transmitted to controller 724 so that controller can adjust container processing module 730 operation, for example, to facilitate more efficient tracking and/or processing of containers. For example, the operating speed of one or more conveyors can be increased or decreased. Data collected and transmitted can be or relate, for example, to the volume and/or quality of plastic processed.

The sorted out and processed plastics material may be baled by baler 732, for easier transport and stored in an industrial-sized storage bunker similar to storage bunker 116 and storage bunker 716 before being transferred to a customer.

The remaining material in container processing module 730, primarily composed of non-plastic material, e.g., ferrous and non-ferrous material, undergoes a quality check by quality controller 720 to ensure that all or substantially all plastics have been removed from the non-plastic material within container processing module 730. Any identified contaminant material can be removed and either placed in the correct bunker or conveyor belt or removed as residue. Alternatively, any identified contaminant material can remain on the conveyor for transfer to a residue bunker or compactor at or near the end of the system.

Ferrous separator 148 is a standard, industrial magnetic or electromagnetic separator that separates and removes ferrous material from container processing module 730. The magnetic belt separator of ferrous separator 148 moves like a conveyor belt and carries the materials to a stripper magnet for controlled discharge. It is preferred that a stainless steel section on existing conveyor installations be utilized for maximum magnet effectiveness. A magnetic drum ferrous separator, such as manufactured by Eriez Magnetics, Erie, Pa., may be used.

The sorted-out and processed ferrous material may be baled by baler 732, for easier transport and stored in an industrial-sized storage bunker (not shown) similar to storage bunker 140 and storage bunker 740 before being transferred to a customer.

Remaining material proceeds to non-ferrous separator 150, which may be either a standard eddy current separator, or an optical sorter that optically sorts and separates out non-ferrous metal, such as aluminum cans and rings, and collects data about the sort that can be transmitted to controller 724. The sorted-out and processed non-ferrous material may be baled by baler 732, and stored in an industrial-sized storage bunker before being transferred to a customer.

It should be understood that for receiving the respective output from optical plastics sorter 718, ferrous separator 142 and non-ferrous separator 144, any number of balers can be used and located, as needed, to suit system 700 capacity and/or operation. In one or more embodiments, in addition to or in lieu of baler 732, at least a portion of the output from optical plastics sorter 718, ferrous separator 142 and non-ferrous separator 144 can be transported, for example, to baler 704 and/or baler 710. The remaining material of container processing module 730 undergoes a quality check by quality controller 722 to ensure that all recyclable material has been removed and processed. Any remaining material, such as glass, that remains is processed and placed into the correct storage bunker or disposed of as residue.

What we claim as new and desire to secure by Letters Patent is as follows:

1. A system for providing a quantity of cullet having at least two colors of glass from an input stream of recyclable material and non-recyclable material having at least two colors of glass, comprising:
   a sortation station for receiving the input stream, and removing from the input stream at least a portion of the non-recyclable material;
   a first screening apparatus configured to substantially remove corrugated fiber products from the input stream;
   a second screening apparatus configured to substantially remove newspaper from the input stream;
   an air classifier for receiving glass from the input stream, and extracting at least one of plastic, aluminum and paper elements from the input stream;
   a crushing apparatus that receives the glass from said air classifier, and breaks substantially all of the glass into pieces having a largest dimension equal to or less than a predetermined length; and
   a third screening apparatus for receiving the crushed glass and removing additional non-glass contaminants, thereby providing as output the cullet comprising at least two colors.

2. The system according to claim 1, the first screening apparatus comprises a disc screen.

3. The system according to claim 1, wherein the second screening apparatus comprises a dual screen separator having an upper screen deck and a lower screen deck.

4. The system according to claim 1, wherein said sortation station comprises at least one manual sorter.

5. The system according to claim 1, wherein the non-recyclable material removed at said sortation station comprises at least one of milk cartons, light bulbs, and styrofoam.

6. The system according to claim 1, wherein the largest dimension is approximately three inches.

7. The system according to claim 1, wherein the largest dimension is approximately two and one-half inches.

8. The system according to claim 1, wherein the at least two colors comprise one of: a) flint and amber, b) flint and green, b) amber and green, and d) flint, amber and green.

9. The system according to claim 1, further comprising a ceramic detector and remover that receives the cullet from said third screening apparatus, and removes at least a portion of any ceramic from the input.

10. The system according to claim 1, further comprising an eddy current separator configured to remove non-ferrous metal from the input stream.

11. A method for providing a quantity of cullet having at least two colors of glass from an input stream of recyclable material and non-recyclable material having at least two colors of glass, comprising:
    a) removing from the input stream at least a portion of the non-recyclable material;
    b) removing corrugated fiber products from the input stream by used of a disc screen apparatus;
    c) removing newspaper from the input stream;
    d) extracting at least one of plastic, aluminum and paper elements from the input stream;
    e) breaking, subsequent to step b), the glass of the input stream into pieces having a largest dimension equal to or less than a predetermined length; and
    f) removing additional non-glass contaminants, thereby providing as output the cullet comprising at least two colors.

12. The method according to claim 11, wherein said step a) is performed by a manual sorter.

13. The method according to claim 11, wherein the removed non-recyclable material comprises at least one of milk cartons, light bulbs, and styrofoam.

14. The method according to claim 11, further comprising the step of receiving subsequent to removing the corrugated fiber products any residual non-glass items that were separated from the glass stream.

15. The method according to claim 11, wherein a dual screen separator having an upper screen deck and a lower screen deck is used to remove the newspaper from the input stream.

16. The method according to claim 11, wherein the largest dimension is approximately three inches.

17. The method according to claim 11, wherein the largest dimension is approximately two and one-half inches.

18. The method according to claim 11, wherein the at least two colors comprise one of: a) flint and amber, b) flint and green, b) amber and green, and d) flint, amber and green.

19. The method according to claim 11, wherein the non-glass contaminants in said step f) comprise ceramic.

20. The method according to claim 11, further comprising the steps of breaking any residual glass items in a same manner as is done at said step e), and directing plastic items to a repository.

21. The method according to claim 20, wherein said directing is performed by at least one manual sorter.

22. The method according to claim 20, further comprising the step of directing the ferrous items to a repository.

23. The method according to claim 22, further comprising the step of directing the non-ferrous items to a repository.

24. The method according to claim 23, further comprising the step of breaking any residual glass remaining subsequent to directing said non-ferrous items in a same manner as is done at said step e).

25. The method according to claim 11, further comprising removing non-ferrous metal from the input stream by use of an eddy current separator.

26. A system for providing a quantity of cullet having at least two colors of glass from an input stream of recyclable material and non-recyclable material having at least two colors of glass, comprising:
- a sortation station for receiving the input stream, and removing from the input stream at least a portion of the non-recyclable material;
- an air classifier for receiving glass from the input stream, and extracting at least one of plastic, aluminum and paper elements from the input stream;
- a crushing apparatus that receives the glass from said air classifier, and breaks substantially all of the glass into pieces having a largest dimension equal to or less than a predetermined length;
- a first screening apparatus for receiving the crushed glass and removing additional non-glass contaminants, thereby providing as output the cullet comprising at least two colors;
- a second screening apparatus for substantially removing corrugated fiber products from the input stream;
- a third screening apparatus for substantially removing newspaper from the input stream, and
- a fourth screening apparatus that receives non-glass items and residual glass from said third screening apparatus, and substantially removes paper items from the non-glass items.

27. The system according to claim 26, wherein the received non-glass items comprise at least one of: a) plastic items, b) ferrous items, c) non-ferrous items, and d) paper items.

28. The system according to claim 26, further comprising a second sortation station that receives an output from said fourth screening apparatus, and directs glass items to said crushing apparatus, and said plastic items to a repository.

29. The system according to claim 28, further comprising a ferrous separator that receives the ferrous items and the non-ferrous items from said second sortation station, and directs the ferrous items to a repository.

30. The system according to claim 29, further comprising a non-ferrous separator that receives said non-ferrous items from said ferrous separator, and directs said non-ferrous items to a repository.

31. The system according to claim 28, wherein the second sortation station comprises at least one manual sorter.

32. The system according to claim 30, wherein any residual glass provided as output from said non-ferrous separator is provided as input to said crushing apparatus.

33. The system according to claim 30, wherein the non-ferrous separator comprises an eddy current separator configured to remove non-ferrous metal from the input stream.

34. The system according to claim 26, wherein said sortation station comprises at least one manual sorter.

35. The system according to claim 26, wherein the non-recyclable material removed at said sortation station comprises at least one of milk cartons, light bulbs, and styrofoam.

36. The system according to claim 26, wherein the largest dimension is approximately three inches.

37. The system according to claim 26, wherein the largest dimension is approximately two and one-half inches.

38. The system according to claim 26, wherein the at least two colors comprise one of: a) flint and amber, b) flint and green, b) amber and green, and d) flint, amber and green.

39. The system according to claim 26, further comprising a ceramic detector and remover that receives the cullet from said third screening apparatus, and removes at least a portion of any ceramic from the input.

* * * * *